US009623721B2

(12) United States Patent
Kim (10) Patent No.: US 9,623,721 B2
(45) Date of Patent: Apr. 18, 2017

(54) ENERGY SAVING AUTOMATIC AIR CONDITIONING CONTROL SYSTEM AND METHOD

(71) Applicant: Hyundai Motor Company, Seoul (KR)

(72) Inventor: Dae Sik Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 386 days.

(21) Appl. No.: 14/493,703

(22) Filed: Sep. 23, 2014

(65) Prior Publication Data

US 2015/0183293 A1    Jul. 2, 2015

(30) Foreign Application Priority Data

Dec. 26, 2013 (KR) .................. 10-2013-0163625

(51) Int. Cl.
*B60H 1/00* (2006.01)

(52) U.S. Cl.
CPC ..... *B60H 1/00764* (2013.01); *B60H 1/00735* (2013.01); *B60H 1/00771* (2013.01); *B60H 1/00807* (2013.01); *B60H 1/00878* (2013.01); *B60H 1/00971* (2013.01); *B60H 1/00985* (2013.01); *B60H 2001/00992* (2013.01); *Y02T 10/88* (2013.01)

(58) Field of Classification Search
CPC ............ B60H 1/00764; B60H 1/00771; B60H 1/00807; B60H 1/00971; B60H 1/00735; B60H 1/00878; B60H 1/00985; B60H 2001/00992
USPC ........................................ 165/202, 203, 204
See application file for complete search history.

(56) References Cited

U.S. PATENT DOCUMENTS

| 6,205,379 | B1 * | 3/2001 | Morisawa ............... B60L 11/14 180/165 |
| 7,286,922 | B1 * | 10/2007 | Fischer ................. F16H 61/143 192/54.1 |
| 2003/0168838 | A1 * | 9/2003 | Breed ............... B60R 21/01526 280/735 |
| 2005/0056413 | A1 * | 3/2005 | Homan ................. B60H 1/004 165/203 |

(Continued)

FOREIGN PATENT DOCUMENTS

| JP | 2001-141475 A | 5/2001 |
| JP | 2005-207321 A | 8/2005 |

(Continued)

*Primary Examiner* — Len Tran
*Assistant Examiner* — Claire Rojohn, III
(74) *Attorney, Agent, or Firm* — Mintz Levin Cohn Ferris Glovsky and Popeo, P.C.; Peter F. Corless (57) ABSTRACT

An energy saving automatic air conditioning control system and an energy saving automatic air conditioning control method enable consumption of a fuel or a battery (referred to as energy) to be minimized and a possible travel distance to be improved by processing data including road environment information such as road loss information, including altitude and traffic information, vehicle information such as a current acceleration/deceleration of a vehicle, and driver tendency information for manipulation of an air conditioner such as control of an air conditioning temperature and stages, automatically determining an air conditioning control time point, and displaying the determined automatic manipulation and control form on a map path of a navigation system.

13 Claims, 8 Drawing Sheets

(56) References Cited

U.S. PATENT DOCUMENTS

| | | | |
|---|---|---|---|
| 2011/0106358 A1* | 5/2011 | Sawada | B60K 11/02 701/22 |
| 2011/0118924 A1* | 5/2011 | Nasu | B60L 15/2045 701/22 |
| 2011/0194321 A1* | 8/2011 | Amano | H02M 7/219 363/126 |
| 2011/0290469 A1* | 12/2011 | Polanco Munoz | F24F 13/0236 165/254 |
| 2012/0065874 A1* | 3/2012 | Sato | B60R 16/0236 701/123 |
| 2012/0168140 A1* | 7/2012 | Yokkoyama | B60L 1/003 165/271 |
| 2013/0166181 A1* | 6/2013 | Pan | F02D 45/00 701/110 |
| 2015/0032279 A1* | 1/2015 | Striuli | H02J 3/46 700/295 |
| 2016/0114683 A1* | 4/2016 | Bruce | B60L 1/00 701/22 |
| 2016/0156299 A1* | 6/2016 | Romanowich | H02P 29/0241 318/400.21 |

FOREIGN PATENT DOCUMENTS

| | | |
|---|---|---|
| JP | 2009-280016 A | 12/2009 |
| JP | 2013119355 A | 6/2013 |
| KR | 10-2008-0048184 A | 6/2008 |
| KR | 10-2010-0020103 | 2/2010 |
| KR | 10-1158815 B1 | 6/2012 |
| KR | 10-2012-0073842 | 7/2012 |
| KR | 10-2012-0073843 | 7/2012 |

* cited by examiner

ENERGY SAVING AUTOMATIC AIR CONDITIONING CONTROL SYSTEM AND METHOD

CROSS-REFERENCE TO RELATED APPLICATION

This application claims under 35 U.S.C. §119(a) the benefit of Korean Patent Application No. 10-2013-0163625, filed on Dec. 26, 2013, the entire contents of which are incorporated herein by reference.

BACKGROUND (a) Technical Field

The present invention relates to an energy saving automatic air conditioning control system and an energy saving automatic air conditioning method, and more particularly to an energy saving automatic air conditioning control system and an energy saving automatic air conditioning method by which use of a fuel and a battery can be minimized by automatically controlling an air conditioner, a blow level, and individual air conditioning according to a navigation travel path when a vehicle is driven.

(b) Description of the Related Art

In general, it is known that fuel consumption of an internal combustion engine increases as an air conditioner is operated and a battery consumption of an environment-friendly vehicle such as an electric vehicle and a hybrid vehicle increases as an air conditioner is operated.

Although Korean Patent Application Publication No. 1998-016290 discloses a wind amount automatic control unit and a wind amount automatic control method of an air conditioner by which a wind amount of the air conditioner is automatically adjusted according to a difference between an interior temperature and an exterior temperature of a vehicle as an example of the related art, the air conditioner is operated regardless of a use amount of a fuel or a battery so that consumption of the fuel or the battery increases.

Japanese Patent No. 3177806 discloses a method of predicting a possible travel distance in consideration of a residual capacity of a battery and road topology information on a travel path, and displaying a route for minimizing consumption of a battery and a possible travel range of the vehicle on a navigation map as another example of the related art.

However, the method of Japanese Patent No. 3177806 only guides a travel path for minimizing consumption of a battery in consideration of a current battery capacity, but substantially cannot save consumption of the battery according to manipulation of various electric parts of the vehicle such as an air conditioner.

SUMMARY

An object of the present invention to provide an energy saving automatic air conditioning control system and an energy saving automatic air conditioning control method by which consumption of a fuel or a battery (hereinafter, referred to as energy) can be minimized and a possible travel distance can be improved by complexly processing data including road environment information such as road loss information, including altitude and traffic information, vehicle information such as a current acceleration/deceleration of a vehicle, and driver tendency information for manipulation of an air conditioner such as control of an air conditioning temperature and stages, automatically determining an air conditioning control time point, and displaying the determined automatic manipulation and control form on a map path of a navigation system.

In accordance with an aspect of the present invention, there is provided an energy saving automatic air conditioning control system including: an air conditioning control time point generating control unit for generating an air conditioning operation profile based on vehicle state information from vehicle controllers and travel path information from a navigation system, and determining an air conditioning control value and a time point; a driving tendency determining control unit for analyzing a driver travel tendency and an air conditioning manipulation tendency as other information for generating the air conditioning profile, and bringing air conditioning driving tendency information into a database; a display/voice control unit for visually displaying for visually displaying information on an air conditioning control value and a time point determined by the air conditioning control time point generating control unit on a navigation map and vocally guiding the information at the same time; and a control result transmitting and monitoring unit for transferring information on an air conditioning control value and a time point to the air conditioner controller, and monitoring arbitrary air conditioning manipulation information to transmit the monitored air conditioning manipulation information to the driving tendency determining control unit.

The air conditioning control time point generating control unit may include: a vehicle state monitoring unit for monitoring vehicle information provided from controllers of the vehicle; a travel path information generating unit for generating travel path information based on information provided by the navigation system; an air conditioning operation profile generating unit for generating an air conditioning operation profile representing a change in a temperature value according to an operation time of the air conditioner based on vehicle state information from the vehicle state monitoring unit, travel path information from the travel path information generating unit, and air conditioning driving tendency information from the driving tendency determining control unit; and an air conditioning control value/time point determining unit for mapping an air conditioning operation profile to an energy consumption according to a change in a travel path, and determining an air conditioning operation parameter value and a maintenance time for control of switching on and off of an air conditioner, control of blow stages, and control of selection of an air conditioning operation.

The driving tendency determining control unit may include: a rule database storing unit for converting dynamic input information including vehicle travel information and air conditioning manipulation information to a rule set for learning and storing the rule set in a table; a learning factor calculating unit for calculating learning factor data representing learned dynamic input information by using a representative extraction rule on repeated driving information and air conditioning maintenance/change section information, among dynamic input information stored in the rule database storing unit; a learning driver tendency generating unit for normalizing dynamic input information of the learning factor data according to static input information representing road information data and calculating finally modified information through a step of identifying a change of learning data, a step of identifying deviation from a learning data range, and a step of giving a frequently adopted road type learning value added value; and a driving tendency database constructing unit for constructing a driving tendency for roads, times, and distances by extracting driving tendency parameters from finally modified information, and constructing a table for conversion of energy consumption per unit for driving tendency databases for roads, times, and distances.

The display/voice control unit may include: a display cycle calculating unit for calculating a display cycle based on energy consumption change information and driving tendency information, including the determined air conditioning control value;

a visual display control unit for bringing a popup window up at the calculated cycle and displaying automatic control on/off and automatic control section information of the air conditioner on the navigation map; and a vocal guide unit for vocally informing the visually displayed information.

The control result transmitting and monitoring unit may include: an automatic control result transmitting unit for transferring information on the air conditioning control value and the time point to an air conditioning controller; a driver air conditioning operation result reflecting unit for monitoring driver air conditioning operation information; and a driver tendency information updating unit for transmitting periodic information from the driver air conditioning operation result reflecting unit.

In accordance with another aspect of the present invention, there is provided an energy saving automatic air conditioning control method including: an air conditioning control time point generating control step of generating an air conditioning operation profile to determine an air conditioning control value and a time point based on vehicle state information and travel path information; a driving tendency determining control step of analyzing driver travel tendency and air conditioning operation tendency as other information for generating the air conditioning operation profile, and bringing driver air conditioning operation tendency information into a database; a display/voice control step of visually displaying information on the determined air conditioning control value and the time point and vocally guiding the information; and a control result transmitting and monitoring step of transferring information on the determined air conditioning control value and time point to an air conditioning controller and monitoring arbitrary air conditioning operation information at the same time.

The air conditioning control time point generating control step may include: a vehicle state monitoring step of monitoring vehicle information; a travel path information generating step of generating travel path information; an air conditioning operation profile generating step of representing a change in a temperature value according to an operation time of an air conditioner based on vehicle state information, travel path information, and driver air conditioning operation tendency information; and an air conditioning control value and time point determining step of mapping an air conditioning profile to consumption energy according to a change in a travel path.

The vehicle state monitoring step may include: acquiring various ECU data of a vehicle; and classifying and formatting the acquired data and filtering only effective data.

The travel path information generating step may include: a travel path information input step of inputting map topology data, real time traffic information, and loss information; a step of mapping information for link paths linked in a travel path to the input travel path information data; a step of calculating an energy minimization point for link paths linked in a current travel path, including the current travel path; and a step of calculating an energy minimization point for link paths within a predetermined radius deviating the current travel path.

The air conditioning operation profile generating step may include: a data integrating step of normalizing vehicle state information, travel path information, and driver air conditioning operation tendency information into physical units, and listing up the normalized information according to an accumulated time (minutes); a step of calculating a current available energy of a vehicle; a step of calculating driving tendency adjusting energy reflecting driver air conditioning operation tendency information; a step of converting path costs according to a change in a travel distance of a travel path into an energy unit (kW/h) by reflecting current available energy and driving tendency adjusting energy; and a step of generating an air conditioning operation profile representing a change in a temperature value according an operation time of an air conditioner from a change in energy for a travel distance.

The air conditioning control value and time point determining step may include: a step of mapping an air conditioning operation profile to consumption energy according to a change in a travel path; and a step of determining an air conditioning control time point according to the mapped data, and determining an air conditioning operation parameter value and a maintenance time for an air conditioner on/off control, a control of a blow stage, and a control of selection of an operation of front and rear air conditioner.

The driving tendency determining control step may include: a rule database storing step of converting dynamic input information including vehicle travel information and air conditioning manipulation information to a rule set for learning and storing the rule set in a table; a learning factor calculating step of calculating learning factor data representing learned dynamic input information by using a representative extraction rule on repeated driving information and air conditioning maintenance/change section information, among dynamic input information stored in the rule database storing unit; a learning driver tendency generating step of normalizing dynamic input information of the learning factor data according to static input information representing road information data and calculating finally modified information through a step of identifying a change of learning data, a step of identifying deviation from a learning data range, and a step of giving a frequently adopted road type learning value added value; and a driving tendency database constructing step of constructing a driving tendency for roads, times, and distances by extracting driving tendency parameters from finally modified information, and constructing a table for conversion of energy consumption per unit for driving tendency databases for roads, times, and distances.

The learned driver tendency generating step may include: a step of normalizing dynamic input information of the learning factor data according to static input information representing road information data and identifying a change of data according to an addition and a deletion of the learned data; a learning data range deviation identifying step of checking and initializing static input information at a point where there is a possibility of generating deviation of a learning data range; and calculating finally modified information through a step of providing an added value to a frequently adopted road type learning value.

The display/voice control step may include: a display cycle calculating step of calculating a display cycle based on energy consumption change information and driving tendency information, including the determined air conditioning control value; a visual display control step of bringing a popup window up at the calculated cycle and displaying automatic control on/off and automatic control section information of the air conditioner on the navigation map; and a vocal guide step of vocally informing the visually displayed information.

The control result transmitting and monitoring step may include: an automatic control result transmitting step of transferring information on the air conditioning control value and the time point to an air conditioning controller; a driver air conditioning operation result reflecting step of monitoring driver air conditioning operation information; and a driver tendency information updating step of transmitting periodic information from the driver air conditioning operation result reflecting unit.

The present invention provides the following effects.

First, road information by which a consumption of vehicle energy (gasoline fuel, and a battery of hybrid and electric vehicles) can be minimized can be generated, and a possible travel distance can be increased by minimizing energy consumption according to an operation of an air conditioner during a travel of the vehicle.

Second, an air conditioning range, an air conditioning control target (control of a blow stage and control of selection of operations of front and rear seats), an air conditioning control time point, and a maintenance time can be determined in a range in which a driver does not feel uncomfortable to a temperature change even when an operation of the air conditioner is controlled within a minimum energy consumption range.

Third, an eco-friendly operation can be deduced positively by guiding air conditioning control related information visually and vocally through a navigation screen to a driver.

Ultimately, consumption of energy can be minimized and a comfortable interior operation environment can be provided while a travel distance can be increased through the system and method according to the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention provides an automatic air conditioning control system and an automatic air conditioning control method by which, in order to minimize energy consumption in consideration of much energy consumption according to an operation of an air conditioner, a consumption of energy (e.g., a battery and a fuel) can be minimized in consideration of a real time driving environment change, by predicting a time point for minimizing energy of the vehicle by using current location and path information (road information) of the vehicle when a navigation path is selected or not selected, calculating an air conditioning operation profile reflecting a vehicle state (an interior temperature and a travel change) and a driver tendency (a frequency and contents of setting manipulations of the air conditioner), and automatically controlling the air conditioner by determining a travel section requiring minimization of energy and an optimum control time point for an air conditioning operation profile and guiding the automatic air conditioning control contents through a navigation screen.

Figure 1:
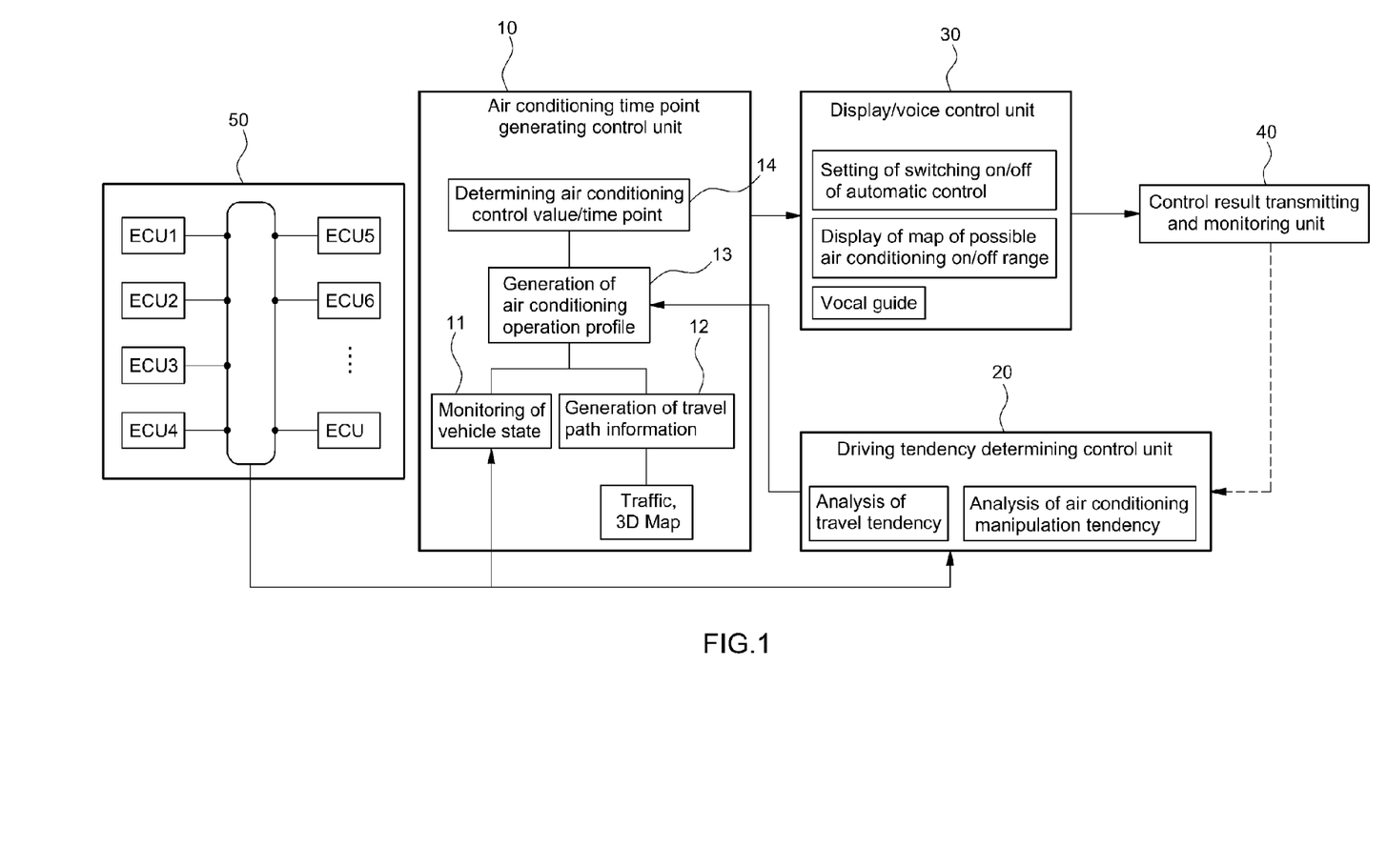
FIG. 1 is a diagram of an energy saving automatic air conditioning system according to an embodiment of the present invention.
Figure 2:
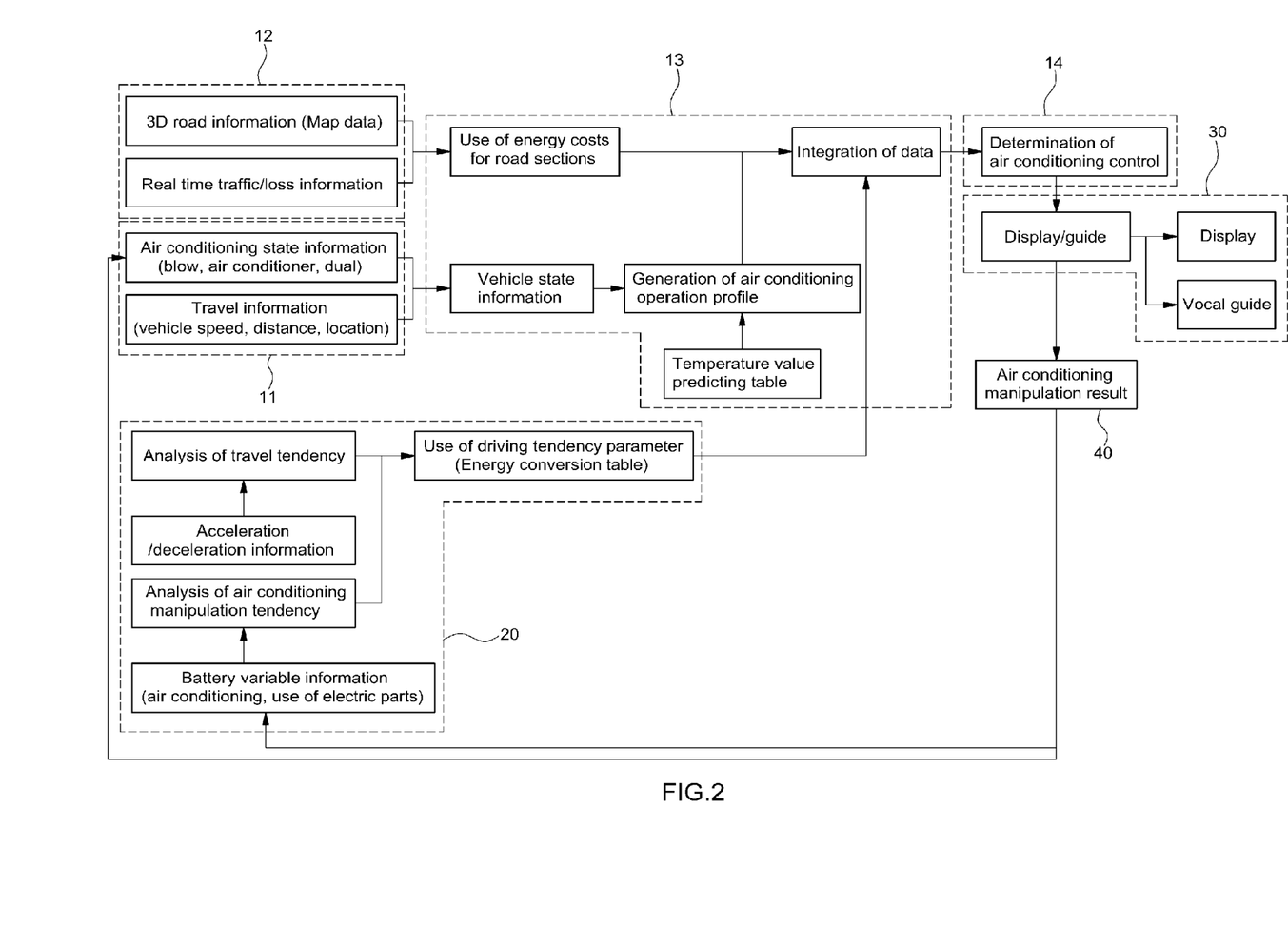
FIG. 2 a control flow diagram showing an energy saving automatic air conditioning control method according to an embodiment of the present invention.

FIGS. 1 and 2 are a diagram and a control flow diagram of an energy saving automatic air conditioning control system according to an embodiment of the present invention.

As shown in FIG. 1, various vehicle controllers 50 are connected to an air conditioning control time point generating control unit 10 and a driving tendency determining control unit 20 to provide vehicle state information to the control units 10 and 20.

The vehicle controllers 50 provide various vehicle travel related information (e.g., a pushing amount of an acceleration pedal, a state of a battery, a braking operation, an air conditioning state, and other information of electric parts) to the air conditioning control time point generating control unit 10 and the driving tendency determining control unit 20 through a vehicle interface (I/F).

The air conditioning control time point generating control unit generates an air conditioning operation profile based on travel path information from a navigation system and air conditioning operation tendency information from a driving tendency determining control unit 30 in addition to vehicle state information from the vehicle controller 50, and determines an air conditioning control value (an air conditioning control parameter value) and a control time point.

In particular, the air conditioning control time point generating control unit 10 includes a vehicle state monitoring unit 11 for monitoring vehicle information provided from various controllers of the vehicle, a travel path information generating unit 12 for generating travel path information based on information provided by the navigation system, an air conditioning operation profile generating unit 13 for generating an air conditioning operation profile, and an air conditioning control value/time point determining unit 14 for determining an air conditioning operation parameter value and a maintenance time.

The vehicle state monitoring unit 11 monitors vehicle information provided by the controllers of the vehicle, and processes vehicle state information, for example, by filtering only effective data.

The travel path information generating unit 12 generates current travel path information based on travel path information (e.g., calculation of 3D topological information, generation of path information according to input of traffic information, and the like) provided by the navigation system.

The air conditioning operation profile generating unit 13 generates an air conditioning operation profile representing a change in a temperature value according to an operation time of the air conditioner based on vehicle state information from the vehicle state monitoring unit 11, travel path information from the travel path information generating unit 12, and air conditioning operation tendency information from the operation tendency determining control unit 30.

The air conditioning control value/time point determining unit 14 integrates data on a current travel path and an air conditioning operation profile and determines an optimized air conditioning control time point.

In particular, the air conditioning control value/time point determining unit 14 maps an air conditioning operation profile to an energy consumption according to a change in a travel path, and determines an air conditioning operation parameter value and a maintenance time for control of switching on and off of an air conditioner, control of blow stages, and control of selection of an air conditioning operation.

Hereinafter, an air conditioning control time point generating control step performed by the air conditioning control time point generating control unit will be described in more detail.

The air conditioning control time point generating control step performed by the air conditioning control time point generating control unit includes a vehicle state monitoring step of monitoring vehicle state information, a travel path information generating step of generating travel path information, an air conditioning operation profile generating step of representing a change in a temperature value according to an operation time of an air conditioner based on the vehicle state information, the travel path information, and driver air conditioning operation tendency information, and an air conditioning control value/time point determining step of mapping the air conditioning operation profile to consumption energy according to a change in a travel path and determining an air conditioning operation parameter value and a maintenance time.

Figure 3:
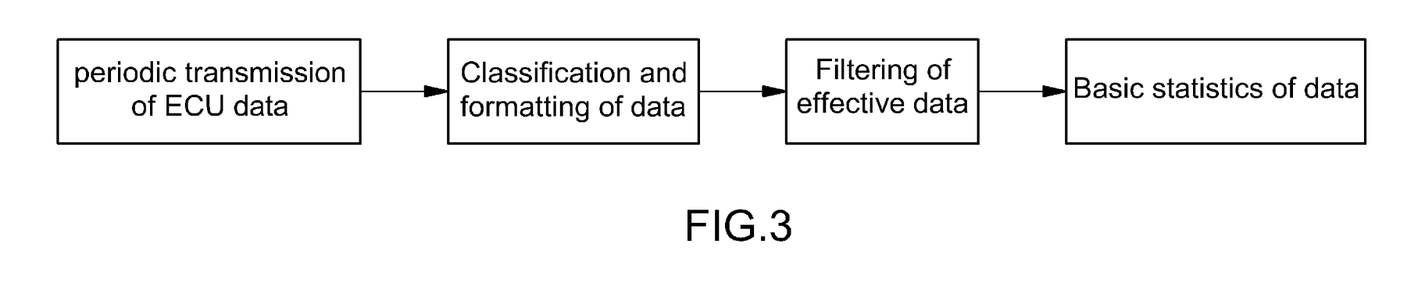
FIG. 3 is a flow chart showing a functional operation of a vehicle state monitoring unit of an air conditioning control time point generation control unit for the energy saving automatic air conditioning control system and method according to the embodiments of the present invention.

As shown in FIG. 3, the vehicle state monitoring step is performed by acquiring data periodically transmitted from various ECUs of a vehicle, that is, various vehicle travel related information data (e.g., a pushing amount of an acceleration pedal, a state of a battery, a braking operation, an air conditioning operation state, and other information of electric parts), classifying and formatting the acquired data, and filtering only effective data.

In particular, vehicle driving data periodically transmitted from various ECUs are acquired and the acquired data are classified and formatted, in which case the data are classified and formatted in the order of air conditioning information, a vehicle speed, a braking operation, and a gear shift, the formatted data are periodically filtered, and only effective data for generating an air conditioning control time point are extracted.

Then, the travel path information generating step for generating travel path information is performed together with the vehicle state monitoring step.

Figure 4:
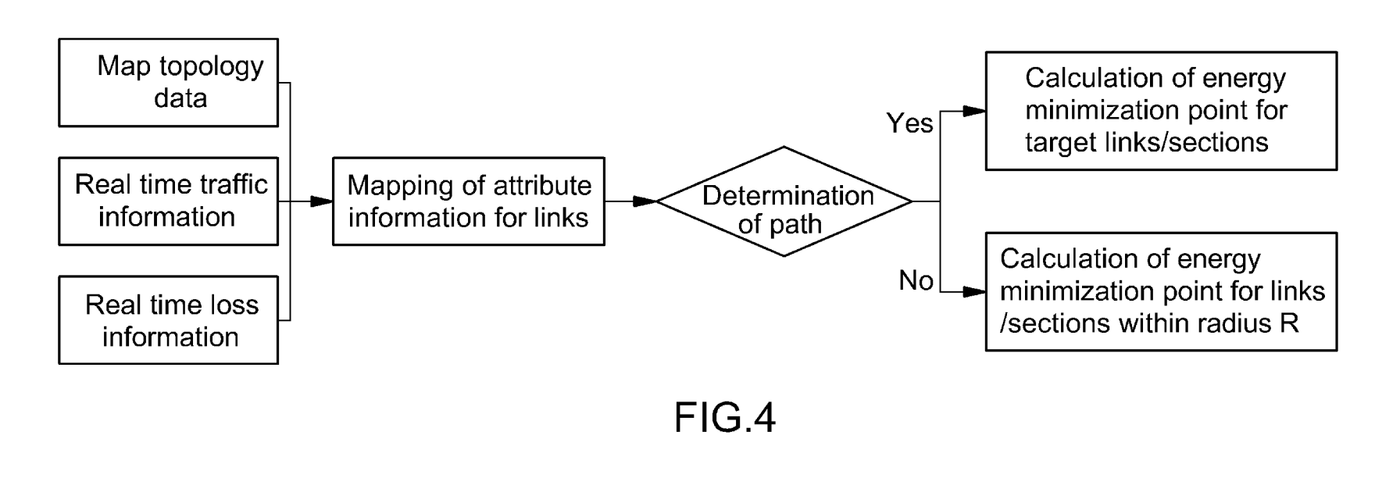
FIG. 4 is a flow chart showing an operation of a travel path information generating unit of the air conditioning control time point generation control unit for the energy saving automatic air conditioning control system and method according to the embodiments of the present invention.

As shown in FIG. 4, after a travel path information input step of inputting real time traffic information and loss information (for example, a loss of a road) including map topological data of a navigation system, information for link paths linked to the travel path is mapped to the input travel path information data.

In particular, in order to reflect both a case in which a navigation path is selected and a case in which a navigation path is not selected, information for link paths linked to the travel path (e.g., information that is not selected as a travel path of the navigation system) is mapped to input travel path information data (e.g., information in which a travel path of the navigation system is selected).

Accordingly, when the current travel path information data correspond to information in which a travel path of the navigation system is selected, a step of calculating a current travel path and an energy minimization point during an operation of the air conditioner for link paths directly linked to the corresponding travel path is carried out.

Even when the current travel path information is path information which has not been selected as a travel path of the navigation system, a step of calculating an energy minimization point during an air conditioning operation for information on a travel path deviating from the current travel path (e.g., a link path within a predetermined radius from the current travel path) is carried out.

Then, the method of calculating the energy minimization point is performed by calculating energy costs according to existence of a travel path (e.g., selection of a travel path of the navigation system) as in Equation 1, determining an energy minimization point, adding energy costs according to the path when a travel path is selected, and adding energy costs for a combination of links within a predetermined radius range (R) from the current vehicle location when a travel path is not selected.

Total costs[Csum]=Link costs[Clink]+Node costs [Cnode]+Other additional costs[Cetec]　　Equation 1

For reference, energy costs consumed for travel paths during an operation of the air conditioner may be brought into a database via a large number of travel tests.

Figure 5:
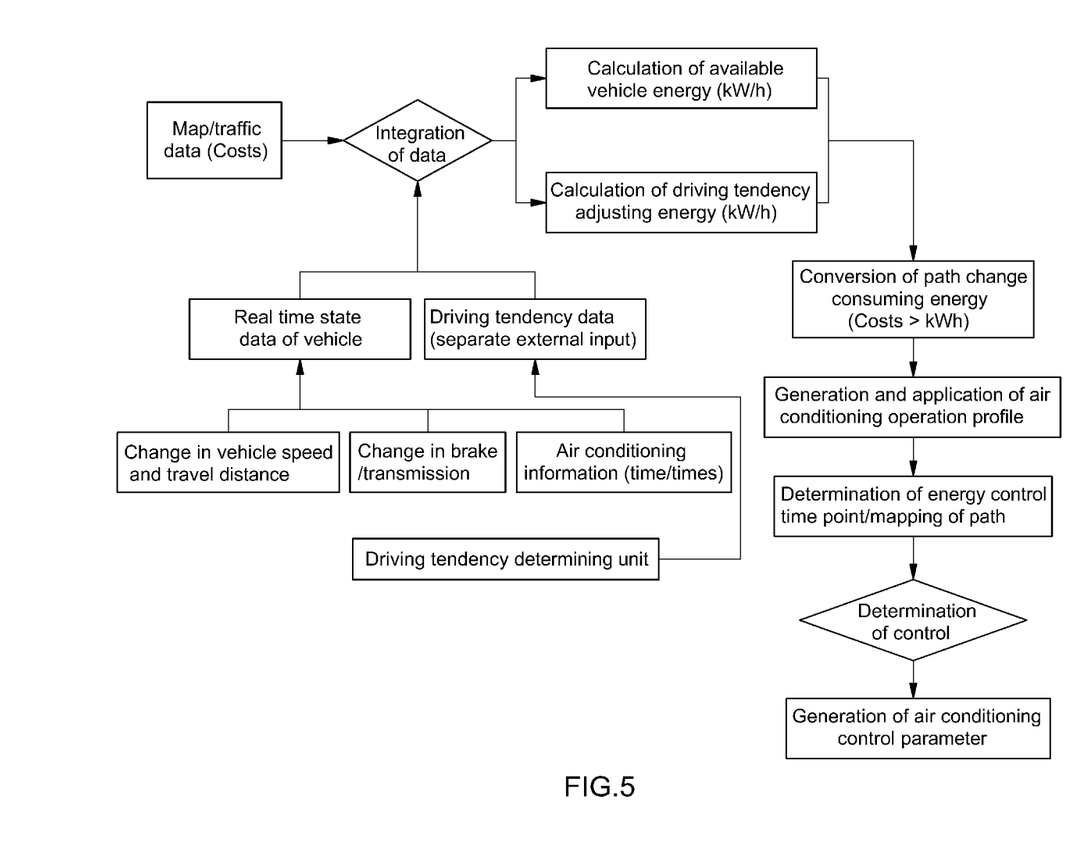
FIG. 5 is a flow chart showing functional operations of an air conditioning operation profiling generating unit and an air conditioning control value/time point determining unit of the air conditioning control time point generation control unit for the energy saving automatic air conditioning control system and method according to the embodiments of the present invention.

Next, as shown in FIG. 5, among the air conditioning control time point generating control step, the air conditioning operation profile generating step and the air conditioning control value/time point determining step are sequentially performed.

In the air conditioning operation profile generating step, an air conditioning operation profile representing a change in a temperature value according to an operation time of the air conditioner is generated based on vehicle state information, travel path information, and driver air conditioning operation tendency information.

In order to generate the air conditioning operation profile, after vehicle state information, travel path information, and driver air conditioning operation tendency information are normalized into a physical unit, the data integrating step of listing up the normalized information according to an accumulated time (minutes) is performed first.

Subsequently, a step of calculating current available energy (kW/h) of the vehicle, and calculating driving tendency adjusting energy which reflects driver air conditioning operation tendency information by which the current available energy is adjusted is performed.

Thereafter, path costs according to a change in a travel distance of a travel path is converted in unit of energy (kW/h), reflecting the current available energy and the driving tendency adjusting energy, and energy changes for the converted travel distances are converted into an air conditioning operation profile which represents a temperature change according to an operation time of the air conditioner.

Next, in the air conditioning control time point generating control step, a step of mapping an air conditioning operation profile to consumption energy according to a change in a travel path and determining an air conditioning parameter value and a maintenance time is performed as an air conditioning control value/time point determining step after the air conditioning operation profile is generated.

In more detail, in the air conditioning control value/time point determining step, an air operation profile is mapped to consumption energy according to a change in a travel path, an air conditioning control time point is determined according to the mapped data, and an air conditioning operation parameter value and a maintenance value for control of switching on/off of the air conditioner, control of blow stages, and control of selection of an operation of air conditioners for front and rear seats are determined.

Hereinafter, the driving tendency determining control unit for providing driver tendency information and an operation thereof in the air conditioning control time point generating step will be described with reference to FIG. 6.

The driving tendency determining control unit 20 functions to analyze a driver travel tendency and an air conditioning manipulation tendency as other information for generating an air conditioning operation profile to bring the air conditioning operation tendency information into a database and provide air conditioning operation tendency information of the driver to the air conditioning control time point generating control unit.

Figure 6:
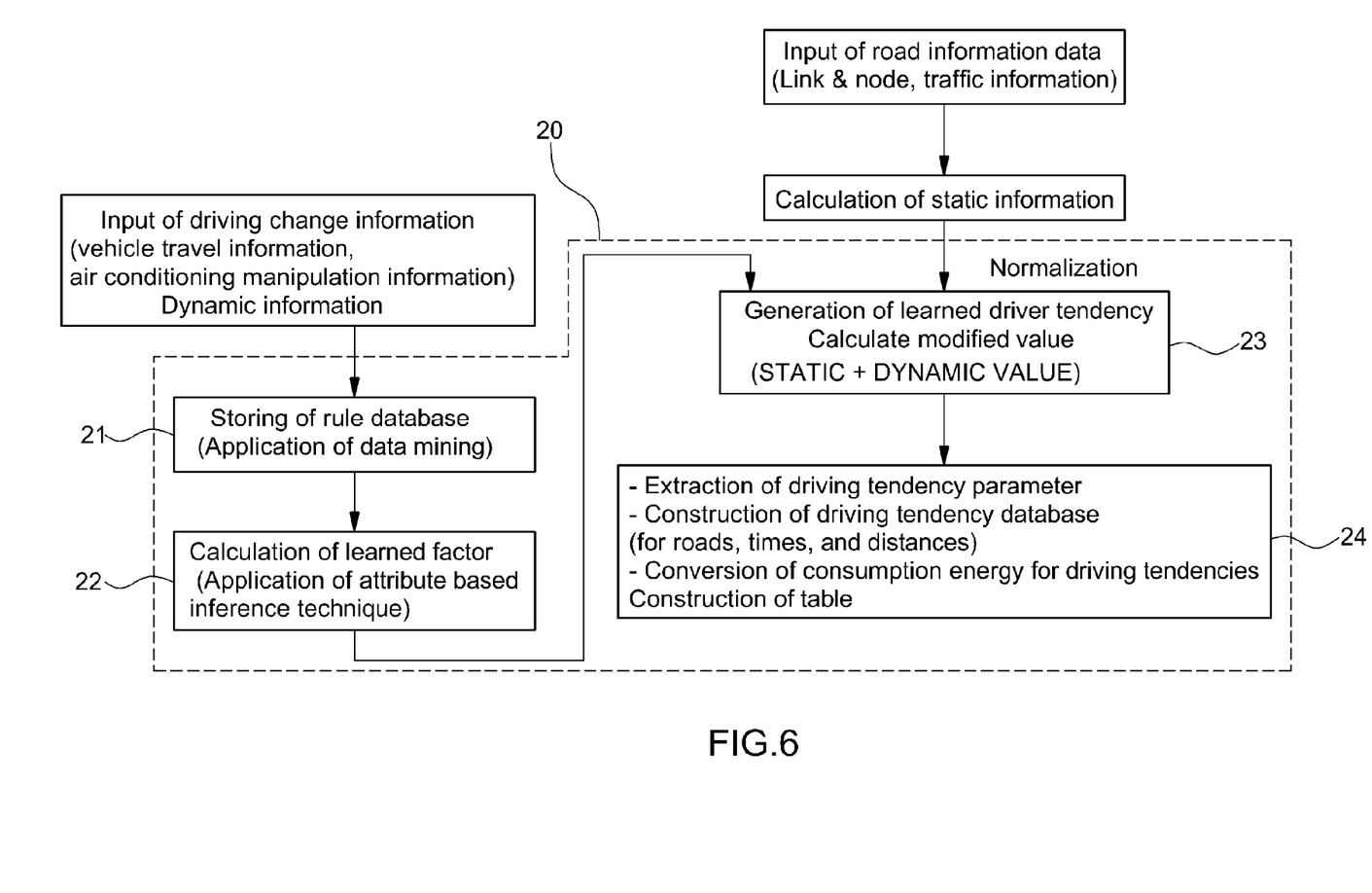
FIG. 6 is a flowchart showing an operation of a driving tendency determining control unit for the energy saving automatic air conditioning control system and method according to the embodiments of the present invention.

In particular, as shown in FIG. 6, the driving tendency determining control unit 20 includes a database storing unit 21, a learning factor calculating unit 22 for calculating learning factor data by using an attribute based inference technique, a learning driver tendency generating unit 23 for normalizing dynamic input information of the learning factor data according to static input information representing road information data and calculating finally modified information, and a driving tendency database constructing unit 24 for constructing a table for conversion of energy consumption for roads, times, and distances.

First, in order to obtain driving tendency determining information, a rule database storing unit 21 converts dynamic input information including vehicle travel information and air conditioning manipulation information to a rule set for learning and stores the converted rule set in a table.

In particular, an attribute generalized table is configured by eliminating an abnormal value and a missing value for the dynamic input information (for example, eliminating an abnormal acceleration/deceleration during a constant speed travel) and converting the dynamic input information to a rule set for learning through attribute generalization.

Thereafter, the learning factor calculating unit 22 calculates the learned dynamic input information including, among the dynamic input information stored in the rule database storing unit 21, repeated operation information, predetermined section information for maintenance and changing of air conditioning by using a representative extraction rule.

Next, after normalizing the dynamic input information of the learning factor data according to static input information representing road information data, the learning driver tendency generating unit 23 performs a step of calculating finally modified information through a step of identifying a change of learning data, a step of identifying deviation of a learning data range, and a step of providing a road type learning value added value which is frequently adopted.

In particular, after normalizing the dynamic input information of the learning factor data according to static input information representing road information data, the learning driver tendency generating unit 23 performs a step of identifying a change of data due to addition and deletion of the learned data, such as addition and deletion of the learned data, at a point where it is necessary to change driving learning guide, a learning data range deviation identifying step of checking and initializing static input information at a point where deviation from a learning data range may be generated, and a step of calculating finally modified information through a step of providing a road type learning value added value which is frequently adopted.

Next, the driving tendency database constructing unit 24 constructs driving tendencies for roads, times, and distances in a database by extracting a driving tendency parameter from finally modified information, and constructs a table for energy consumption conversion per unit for driving tendency databases for roads, times, and distances.

In particular, the driving tendency database constructing unit 24 constructs a driving tendency for roads, times, and distances in a database through a step of classifying a driving tendency into n parameters (for example, type A=a1+a5+c2, type B=a2+c2) such that physical values according to the driving tendency may be adjusted based on the driving tendency parameters and the consumption predicted energy generating rule, and a step of arranging the n parameters such that the n parameters may be mapped and freely combined according to the accumulated road types, times, and travel distances.

In this case, the n parameters are generated when the driving tendency database DB is constructed while an output value is taken as an input parameter value, and the input parameter value, and the input parameter value is averaged by repeating calculations n times by using acceleration/deceleration, air conditioning maintenance time, and an air conditioning attribute, which step may be referred to as normalization or scale mapping.

After constructing driving tendencies for roads, times, and distances in a database, the driving tendency determining control unit 20 constructs a table for performing energy consumption conversion per unit for driving tendency databases, that is, roads, times, and distances, and provides the table to the air conditioning control time point generating control unit as other information for generating an air conditioning operation profile.

Meanwhile, the energy saving automatic air conditioning control system according to the embodiment of the present invention includes a display/voice control unit 30 for visually displaying information on an air conditioning control value and a time point determined by the air conditioning control time point generating control unit 10 on a navigation map and vocally guiding the information at the same time.

Figure 7:
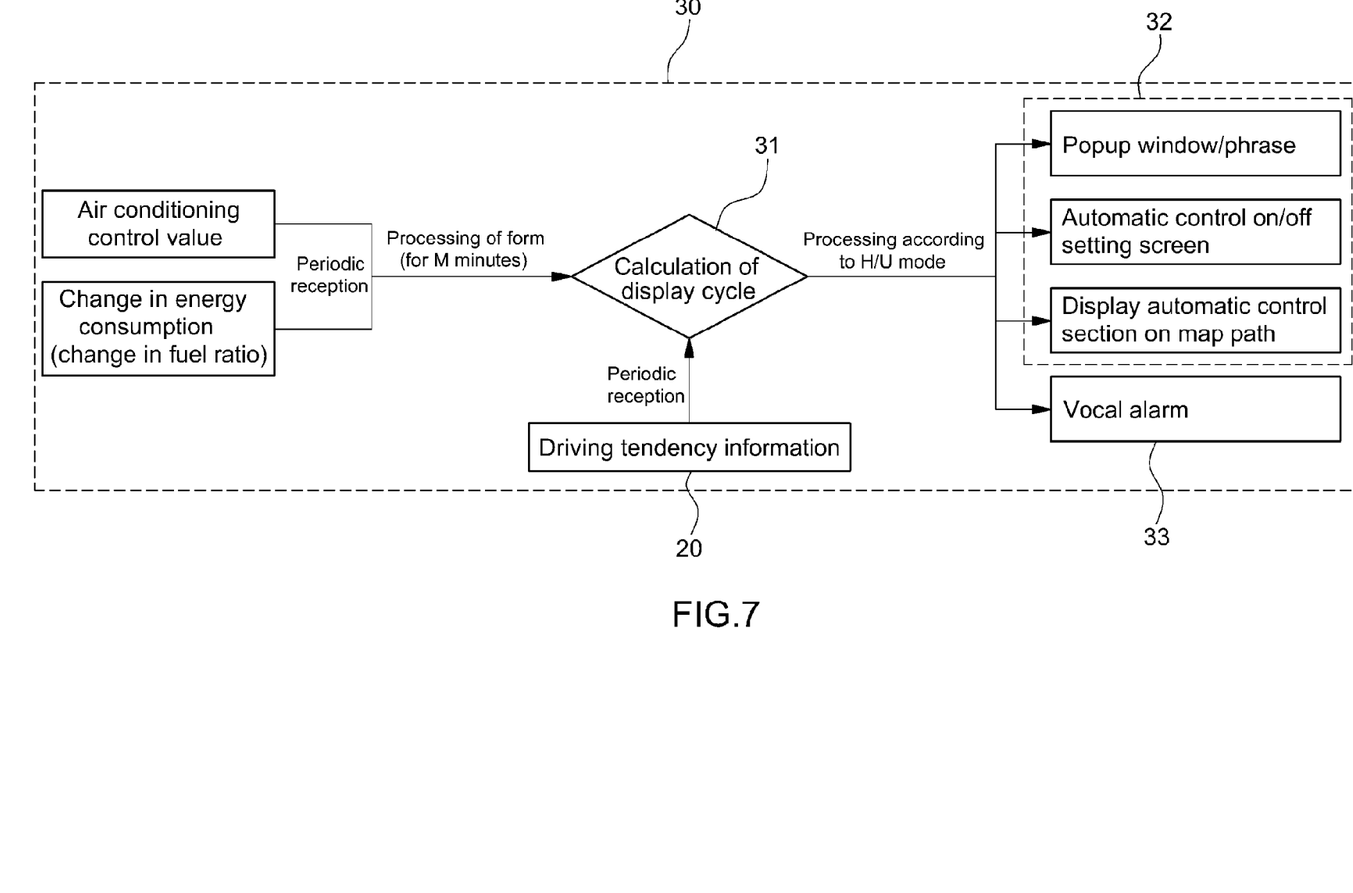
FIG. 7 is a flowchart showing an operation of a display/voice control unit for the energy saving automatic air conditioning control system and method according to the embodiments of the present invention.

As shown in FIG. 7, the display/voice control unit 30 includes a display cycle calculating unit 31 for calculating a display cycle based on energy consumption change information and driver tendency information during an air conditioning operation, including an air conditioning control value determined by the air conditioning control time point generating control unit 10 and information on an air conditioning control time point, a visual display control unit 32 for bringing a popup window up at a cycle calculated under the control of a head unit (e.g., an upper level controller of an AVN system) and displaying automatic control on/off and automatic control section information of the air conditioner on the navigation map, and a vocal guide unit 33 for vocally informing the visually displayed information.

First, the display cycle calculating unit 31 calculates a display cycle based on energy consumption change information and driving tendency information, including information on an air conditioning control value and a time point determined by the air conditioning control time point generating control unit 10, and periodically monitors a driving speed and an energy (e.g., a battery and an internal combustion engine fuel) consumption change when the display cycle is calculated and periodically monitors driving tendency information.

Thereafter, the visual display control unit 32 allows the driver to visually recognize air conditioner related control information by bringing a popup window at the calculated cycle and displaying automatic control on/off and automatic control section information of the air conditioner on the navigation map.

Then, a vocal guide step of vocally informing the same information when the air conditioner related control information is visually displayed, by the vocal guide unit is performed at the same time, so that the driver may audibly recognize the air conditioner related control information.

Preferably, the air conditioner related control information displayed on the navigation screen is air conditioning automatic control requiring section and control target information during a travel path of the map, and for example, may include a start/end of a control, an air conditioner on/off control, a blow stage control, a front and rear seat air conditioner operation selection control, and a control maintenance time. Of course, an on/off setting screen for a series of automatic control on/off manipulations may be displayed.

Meanwhile, the energy saving automatic air conditioning control system according to the embodiment of the present invention includes a control result transmitting and monitoring unit 40 for transferring information on an air conditioning control value and a time point determined by the air conditioning control time point generating control unit 10 and monitoring arbitrary air conditioning manipulation information to transmit the monitored air conditioning manipulation information to the driving tendency determining control unit 20.

Figure 8:
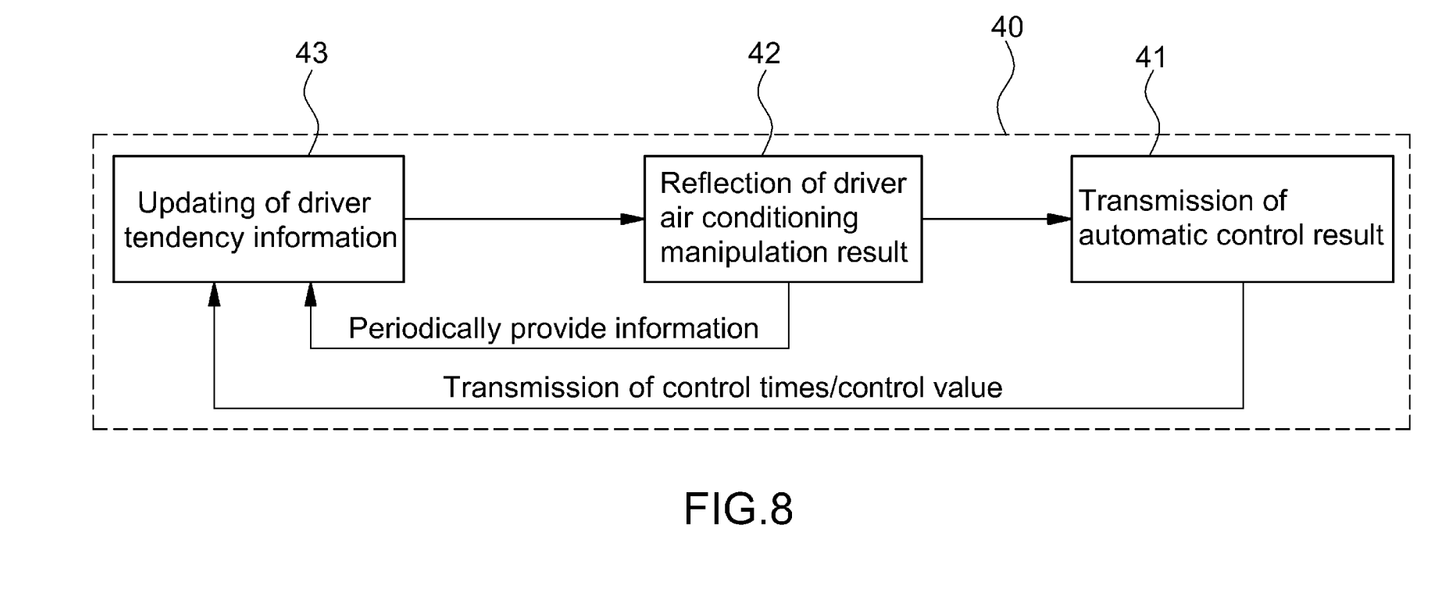
FIG. 8 is a flowchart showing transmission of a control result and an operation of the monitoring unit for the energy saving automatic air conditioning control system and method according to the embodiments of the present invention.

As shown in FIG. 8, the control result transmitting and monitoring unit 40 includes an automatic control result transmitting unit 41 for transferring information on an air conditioning control value and a time point to the air conditioning controller, a driver air conditioning manipulation result reflecting unit 42 for monitoring driver air conditioning manipulation information, and a driver tendency information updating unit 43 for transmitting periodic information from the driver air conditioning manipulation result reflecting unit to the driving tendency determining control unit.

First, the automatic control result transmitting unit 41 transfers the information on an air conditioning control value and a time point determined by the air conditioning control time point generating control unit 10 so that the air conditioning controller controls air conditioning, in which case the air conditioning control is performed according to the information transferred to the air conditioning controller (for example, a start/end of a control, an air conditioner on/off control, a blow stage control, a front/rear seat air conditioner operation selecting control, and a control maintenance time).

Then, the driver air conditioning manipulation result reflecting unit 42 monitors driver air conditioning manipulation information as periodic information, and stores a result arbitrarily manipulated by the driver, that is, arbitrary manual manipulation contents in addition to automatic control information and transmits the result to the driver tendency information updating unit 43.

Accordingly, the driver tendency information updating unit 43 transmits information from the driver air conditioning manipulation result reflecting unit 42 to the driving tendency determining control unit so that driver tendency information may be updated.

Figure 9:
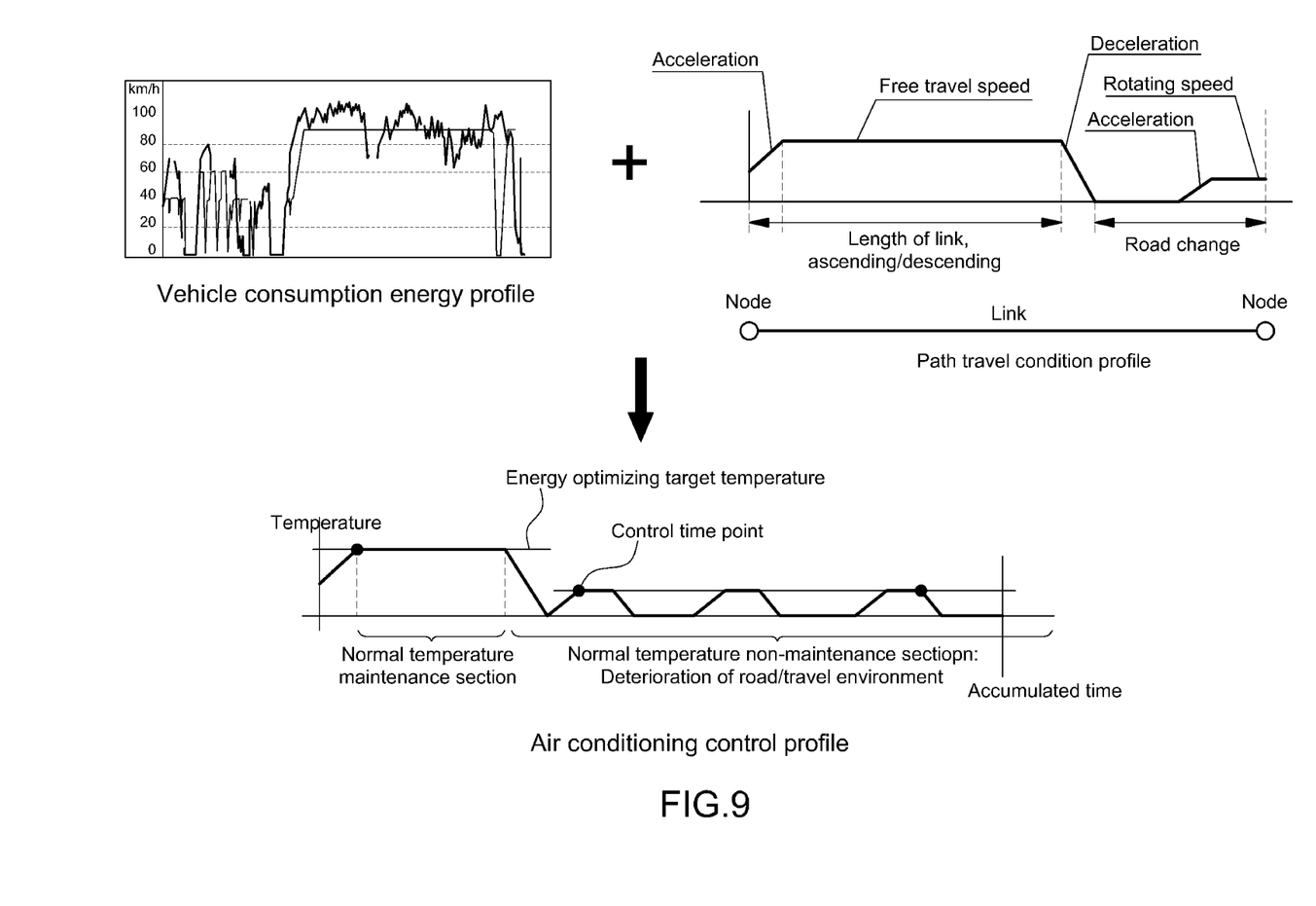
FIG. 9 is a view showing a principle of generating an air conditioning operation profile in the energy saving automatic air conditioning control system and method according to the embodiments of the present invention.

FIG. 9 is a view showing a principle of generating an air conditioning operation profile in the energy saving automatic air conditioning control system and method according to the embodiments of the present invention.

As shown in FIG. 9, an air conditioning operation profile representing a change in a temperature value according to an air conditioner operation time may be generated based on a vehicle consumption energy profile, vehicle state information, and a path travel condition profile of the navigation system so that the air conditioner may be automatically controlled by determining an optimum control time point for a travel section requiring minimization of energy and an air conditioning operation profile.

A consumption of energy (e.g., a battery and a fuel) considering a real time operation environment change can be minimized through a method of switching off the air conditioner in a normal temperature maintaining section (e.g., a constant speed travel and a flat ground), that is, in a section in which a temperature of the vehicle may be maintained for a predetermined period, and repeating switching on/off of the air conditioner in a normal temperature non-maintenance section (deterioration of an environment of a road, a traffic congestion, and an abrupt acceleration predicted time point), that is, in a section in which air conditioning is required to be controlled while a temperature change of the vehicle is minimized.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An energy saving automatic air conditioning control system, comprising: an air conditioning control time point generating control unit for generating an air conditioning operation profile based on vehicle state information from vehicle controllers and travel path information from a navigation system, and determining an air conditioning control value and a time point; a driving tendency determining control unit for analyzing a driver travel tendency and an air conditioning manipulation tendency as other information for generating the air conditioning profile, and bringing air conditioning driving tendency information into a database; a display/voice control unit for visually displaying for visually displaying information on the air conditioning control value and the time point determined by the air conditioning control time point generating control unit on a navigation map and vocally guiding the information at the same time; and a control result transmitting and monitoring unit for transferring the information on the air conditioning control value and the time point to the air conditioner controller, and monitoring arbitrary air conditioning manipulation information to transmit the monitored air conditioning manipulation information to the driving tendency determining control unit, wherein the air conditioning control time point generating control unit comprises; a vehicle state monitoring unit for monitoring vehicle information provided from controllers of the vehicle; a travel path information generating unit for generating travel path information based on information provided by the navigation system; an air conditioning operation profile generating unit for generating an air conditioning operation profile representing a change in a temperature value according to an operation time of the air conditioner based on vehicle state information from the vehicle state monitoring unit, travel path information from the travel path information generating unit, and air conditioning driving tendency information from the driving tendency determining control unit; and an air conditioning control value/time point determining unit for mapping an air conditioning operation profile to an energy consumption according to a change in a travel path, and determining an air conditioning operation parameter value and a maintenance time for control of switching on and off of an air conditioner, control of blow stages, and control of selection of an air conditioning operation.

2. The energy saving automatic air conditioning control system of claim 1, wherein the driving tendency determining control unit comprises:
a rule database storing unit for converting dynamic input information including vehicle travel information and air conditioning manipulation information to a rule set for learning and storing the rule set in a table;
a learning factor calculating unit for calculating learning factor data representing learned dynamic input information by using a representative extraction rule on repeated driving information and air conditioning maintenance/change section information, among dynamic input information stored in the rule database storing unit;
a learning driver tendency generating unit for normalizing dynamic input information of the learning factor data according to static input information representing road information data and calculating finally modified information through a step of identifying a change of learning data, a step of identifying deviation from a learning data range, and a step of giving a frequently adopted road type learning value added value; and
a driving tendency database constructing unit for constructing a driving tendency for roads, times, and distances by extracting driving tendency parameters from finally modified information, and constructing a table for conversion of energy consumption per unit for driving tendency databases for roads, times, and distances.

3. The energy saving automatic air conditioning control system of claim 1, wherein the display/voice control unit comprises:
a display cycle calculating unit for calculating a display cycle based on energy consumption change information and driving tendency information, including the determined air conditioning control value;
a visual display control unit for bringing a popup window up at the calculated cycle and displaying automatic control on/off and automatic control section information of the air conditioner on the navigation map; and
a vocal guide unit for vocally informing the visually displayed information.

4. The energy saving automatic air conditioning control system of claim 1, wherein the control result transmitting and monitoring unit comprises:
an automatic control result transmitting unit for transferring information on the air conditioning control value and the time point to an air conditioning controller;

a driver air conditioning operation result reflecting unit for monitoring driver air conditioning operation information; and a driver tendency information updating unit for transmitting periodic information from the driver air conditioning operation result reflecting unit.

5. An energy saving automatic air conditioning control method, comprising: an air conditioning control time point generating control step of generating an air conditioning operation profile to determine an air conditioning control value and a time point based on vehicle state information and travel path information; a driving tendency determining control step of analyzing driver travel tendency and air conditioning operation tendency as other information for generating the air conditioning operation profile, and banging driver air conditioning operation tendency information into a database; a display/voice control step of visually displaying information on the determined air conditioning control value and the time point and vocally guiding the information; and a control result transmitting and monitoring step of transferring information on the determined air conditioning control value and time point to an air conditioning controller and monitoring arbitrary air conditioning operation information at the same time, wherein the air conditioning control time point generating control step comprises: a vehicle state monitoring step of monitoring vehicle information; a travel path information generating step of generating travel path information; an air conditioning operation profile generating step of representing a change in a temperature value according to an operation time of an air conditioner based on vehicle state information, travel path information, and driver air conditioning operation tendency information; and an air conditioning control value and time point determining step of mapping an air conditioning profile to consumption energy according to a change in a travel path.

6. The energy saving automatic air conditioning control method of claim 5, wherein the vehicle state monitoring step comprises:
   acquiring various ECU data of a vehicle; and
   classifying and formatting the acquired data and filtering only effective data.

7. The energy saving automatic air conditioning control method of claim 5, wherein the travel path information generating step comprises:
   a travel path information input step of inputting map topology data, real time traffic information, and loss information;
   a step of mapping information for link paths linked in a travel path to the input travel path information data;
   a step of calculating an energy minimization point for link paths linked in a current travel path, including the current travel path; and
   a step of calculating an energy minimization point for link paths within a predetermined radius deviating the current travel path.

8. The energy saving automatic air conditioning control method of claim 5, wherein the air conditioning operation profile generating step comprises:
   a data integrating step of normalizing vehicle state information, travel path information, and driver air conditioning operation tendency information into physical units, and listing up the normalized information according to an accumulated time (minutes);
   a step of calculating a current available energy of a vehicle;

a step of calculating driving tendency adjusting energy reflecting driver air conditioning operation tendency information;
a step of converting path costs according to a change in a travel distance of a travel path into an energy unit (kW/h) by reflecting current available energy and driving tendency adjusting energy; and
a step of generating an air conditioning operation profile representing a change in a temperature value according an operation time of an air conditioner from a change in energy for a travel distance.

9. The energy saving automatic air conditioning control method of claim 5, wherein the air conditioning control value and time point determining step comprises:
   a step of mapping an air conditioning operation profile to consumption energy according to a change in a travel path; and
   a step of determining an air conditioning control time point according to the mapped data, and determining an air conditioning operation parameter value and a maintenance time for an air conditioner on/off control, a control of a blow stage, and a control of selection of an operation of front and rear air conditioner.

10. The energy saving automatic air conditioning control method of claim 5, wherein the driving tendency determining control step comprises:
   a rule database storing step of converting dynamic input information including vehicle travel information and air conditioning manipulation information to a rule set for learning and storing the rule set in a table;
   a learning factor calculating step of calculating learning factor data representing learned dynamic input information by using a representative extraction rule on repeated driving information and air conditioning maintenance/change section information, among dynamic input information stored in the rule database storing unit;
   a learning driver tendency generating step of normalizing dynamic input information of the learning factor data according to static input information representing road information data and calculating finally modified information through a step of identifying a change of learning data, a step of identifying deviation from a learning data range, and a step of giving a frequently adopted road type learning value added value; and
   a driving tendency database constructing step of constructing a driving tendency for roads, times, and distances by extracting driving tendency parameters from finally modified information, and constructing a table for conversion of energy consumption per unit for driving tendency databases for roads, times, and distances.

11. The energy saving automatic air conditioning control method of claim 10, wherein the learned driver tendency generating step comprises:
   a step of normalizing dynamic input information of the learning factor data according to static input information representing road information data and identifying a change of data according to an addition and a deletion of the learned data;
   a learning data range deviation identifying step of checking and initializing static input information at a point where there is a possibility of generating deviation of a learning data range; and
   calculating finally modified information through a step of providing an added value to a frequently adopted road type learning value.

12. The energy saving automatic air conditioning control method of claim 5, wherein the display/voice control step comprises:
- a display cycle calculating step of calculating a display cycle based on energy consumption change information and driving tendency information, including the determined air conditioning control value;
- a visual display control step of bringing a popup window up at the calculated cycle and displaying automatic control on/off and automatic control section information of the air conditioner on the navigation map; and
- a vocal guide step of vocally informing the visually displayed information.

13. The energy saving automatic air conditioning control method of claim 5, wherein the control result transmitting and monitoring step comprises:
- an automatic control result transmitting step of transferring information on the air conditioning control value and the time point to an air conditioning controller;
- a driver air conditioning operation result reflecting step of monitoring driver air conditioning operation information; and
- a driver tendency information updating step of transmitting periodic information from the driver air conditioning operation result reflecting unit.

* * * * *